United States Patent
Kim et al.

(10) Patent No.: US 7,623,701 B2
(45) Date of Patent: Nov. 24, 2009

(54) APPARATUS AND METHOD FOR RECONSTRUCTING 3D SHAPE OF OBJECT WITH DEPTH DISCONTINUITY USING HELMHOLTZ STEREOPSIS

(75) Inventors: Jae-Chul Kim, Daejon (KR); Chang-Woo Chu, Daejon (KR); Bon-Ki Koo, Daejon (KR); Byoung-Tae Choi, Daejon (KR); Hyun-Bin Kim, Daejon (KR)

(73) Assignee: Electronics and Telecommunications Research Institute, Daejon (KR)

( * ) Notice: Subject to any disclaimer, the term of this patent is extended or adjusted under 35 U.S.C. 154(b) by 734 days.

(21) Appl. No.: 11/295,916

(22) Filed: Dec. 6, 2005

(65) Prior Publication Data
US 2006/0126929 A1    Jun. 15, 2006

(30) Foreign Application Priority Data
Dec. 10, 2004  (KR)  ................ 10-2004-0104212

(51) Int. Cl.
*G06K 9/00*  (2006.01)
(52) U.S. Cl. .................................. 382/154
(58) Field of Classification Search .................. 382/154
See application file for complete search history.

(56) References Cited

U.S. PATENT DOCUMENTS 6,590,669 B1    7/2003   Wagner

OTHER PUBLICATIONS

Heikkila et al ("Calibration Procedure for Short Focal Length Off-the-Shelf CCD Cameras"), Proceedings of ICPR '96, pp. 166- 170, 1996.*
"Binocular Helmholtz Stereopsis", T. Zickler, et al., Internaitonal Conference on Computer Vision, vol. 2, IEEE 2003, pp. 1411-1417.
"Helmholtz Steropsis: Exploiting Reciprocity for Surface Reconstruction", International Journal of Computer Vision, vol. 49 (2-3), 2002, pp. 215-227.
"Toward a Stratification of Helmholtz Stereopsis" by Todd E. Zickler, et al.; *Proceedings of the 2003 IEEE Computer Society Conference on Computer Vision and Pattern Recognition*; 2003, pp. 548-555.
"Binocular Helmholtz Stereopsis" by Todd E. Zickler, et al.; Proceedings of the Ninth IEEE International Conference on Computer Vision, 2003; pp. 1411-1417.

* cited by examiner

*Primary Examiner*—Bhavesh M Mehta
*Assistant Examiner*—Soo Jin Park
(74) *Attorney, Agent, or Firm*—Blakely, Sokoloff Taylor & Zafman

(57) ABSTRACT

Provided is an apparatus for reconstructing a 3D shape of an object by using Helmholtz stereopsis. The apparatus includes: an image capturer for capturing two pairs of images satisfying Helmholtz reciprocity condition; a preprocessor for estimating optical and geometrical characteristics of a camera used for the image capturing; and a geometrical data reconstructor for converting Helmholtz restrictions generated from the respective pairs of the images into partial differential equations on the basis of the estimated optical and geometrical characteristics, and reconstructing 3D surface data of an object with depth discontinuity at a boundary between regions on the basis of the partial differential equations.

10 Claims, 3 Drawing Sheets

APPARATUS AND METHOD FOR RECONSTRUCTING 3D SHAPE OF OBJECT WITH DEPTH DISCONTINUITY USING HELMHOLTZ STEREOPSIS

FIELD OF THE INVENTION

The present invention relates to an apparatus and method for reconstructing a three-dimensional (3D) shape of an object with depth discontinuity using Helmholtz stereopsis; and, more particularly, to an apparatus and method for reconstructing a 3D shape of an object with depth discontinuity at a boundary between regions thereof using Helmholtz stereopsis.

DESCRIPTION OF RELATED ART

Typical techniques for reconstructing a 3D shape of an object using an illuminator include photometric stereo and a 3D scanner using moiré pattern light. Recently, there has been introduced a Helmholtz stereopsis technique for reconstructing a 3D shape of an image using Helmholtz reciprocity condition which states that ratio between a incident light radiance and a reflected light radiance does not change when the positions of incidence and reflection are interchanged.

The Helmholtz stereopsis technique is advantageous in that it can reconstruct a 3D shape of an object irrespective of surface characteristics of the object.

Due to this feature of the Helmholtz stereopsis, it can reconstruct the shape of a glittering object or a hair-covered object, which was not handled through the conventional 3D scanner.

For reference, "Method for optically detecting the shape of objects" disclosed in the U.S. Pat. No. 6,590,669 issued on Jul. 8, 2003" enables obtainment of a 3D surface shape of an object through combination of the photometric stereopsis with binocular stereo, which will be hereinafter referred to as "first prior art". The first prior art obtains a 3D shape of an object through stereo matching of normal vector components of the object that is written in respective images obtained using the photometric stereo. The first prior art does not use the Helmholtz stereopsis enabling a 3D modeling irrespective of surface characteristics of an object.

Also disclosed is "Helmholtz Stereopsis: Exploiting Reciprocity for Surface Reconstruction (International Journal of Computer Vision, Vol. 49, Todd Zickler et al., pp 215-227, Sep. 10, 2002)" introducing the theoretical basis of the Helmholtz stereopsis, which will be hereinafter referred to as "second prior art"). The second prior art reconstructs a 3D shape of an object by using at least three pairs of images satisfying the Helmholtz reciprocity condition. However, several tens of images are usually required for obtaining a high-quality 3D image. That is, the second prior art undesirably requires a lot of time for reconstructing the 3D shape because it has to handle a large number of images.

Further disclosed is "Binocular Helmholtz Stereopsis (International Conference on Computer Vision, Vol. 2, D. J. Kriegman et al., pp 1411-1417, October, 2003)" capable of obtaining a 3D shape of an object with continuous surfaces by using only two images under the orthographic imaging conditions, which will be hereinafter referred to as "third prior art". The third prior art converts Helmholtz restrictions generated from the two images satisfying the Helmholtz reciprocity condition into a partial differential equation and calculates 3D surface data, which best satisfy the partial differential equation, through the dynamic programming. Since the third prior art uses only two images for 3D reconstruction, it can more simply obtain a reliable 3D surface shape of an object than the conventional Helmholtz technique. The third prior is however unable to obtain the 3D surface shape when the object has discontinuous surfaces.

In summary, the prior arts have the following problems.

The first prior art cannot process the shape of an object with arbitrary surface reflections such as a glossy object or a furry object. The second prior art undesirably requires a lot of time for reconstructing the 3D shape because it has to use at least six images, and usually use several tens of images. The third prior art is unable to obtain the 3D surface shape when the object has discontinuous surfaces.

Accordingly, there is required a method for efficiently obtaining a 3D shape of an object having depth discontinuity at a boundary between regions thereof.

SUMMARY OF THE INVENTION

It is, therefore, an object of the present invention to provide an apparatus and method for efficiently reconstructing a 3D shape of an object having depth discontinuity at a boundary between regions thereof.

In accordance with an aspect of the present invention, there is provided an apparatus for reconstructing a 3D shape of an object by using Helmholtz stereopsis, the apparatus including: an image capturer for capturing two pairs of images satisfying Helmholtz reciprocity condition; a preprocessor for estimating optical and geometrical characteristics of a camera used for the image capturing; and a geometrical data reconstructor for converting Helmholtz restrictions generated from the respective pairs of the images into partial differential equations on the basis of the estimated optical and geometrical characteristics, and reconstructing 3D surface data of an object with depth discontinuity at a boundary between regions on the basis of the partial differential equations.

In accordance with another aspect of the present invention, there is provided a method for reconstructing a 3D shape of an object by using Helmholtz stereopsis, the method including steps of: capturing two pairs of images satisfying Helmholtz reciprocity condition; estimating optical and geometrical characteristics of a camera used for the image capturing; warping each pair of images for one 3D point to place on the same epipolar line; calculating a normalized normal vector of the object on the basis of the warped images; calculating and optimizing 3D surface data of the object according best with the calculated normal vector; and determining a function representing 3D data of the object in consideration of the minimum cost from the optimization step.

Accordingly, the 3D data of the object can be reconstructed more accurately and efficiently than the prior arts.

BRIEF DESCRIPTION OF THE DRAWINGS

The above and other objects and features of the present invention will become apparent from the following description of the preferred embodiments given in conjunction with the accompanying drawings, in which.

DETAILED DESCRIPTION OF THE INVENTION

Other objects and aspects of the invention will become apparent from the following description of the embodiments with reference to the accompanying drawings, which is set forth hereinafter.

The third prior art can easily obtain a 3D shape of an object but is unable to obtain the 3D surface shape when the object has discontinuous surfaces. To solve this problem, the present invention proposes a technique for efficiently obtaining 3D data of an object having discontinuous surfaces while providing the easy obtainment of the 3D data.

Also, the third prior art can accurately obtain only 3D data of a direction parallel to a baseline of a camera that has captured two images, but is unable to accurately obtain 3d data of a direction perpendicular to the baseline. That is, the third prior art approximately estimates the 3D data of the direction perpendicular to the base line of the camera. To solve this problem, the present invention proposes a technique for accurately obtaining the 3D shape of the object without approximation by capturing images of the object at four positions perpendicular to one another.

That is, the present invention obtains the 3D data of the object having depth discontinuity at a boundary between regions by using the Helmholtz stereopsis. The present invention captures two pairs of images of the object satisfying the Helmholtz reciprocity condition at positions perpendicular to one another, converts the restrictions of the Helmholtz reciprocity condition into partial differential equations, and optimizes the partial differential equations through the dynamic programming to calculate the 3D data of the object.

Figure 1:
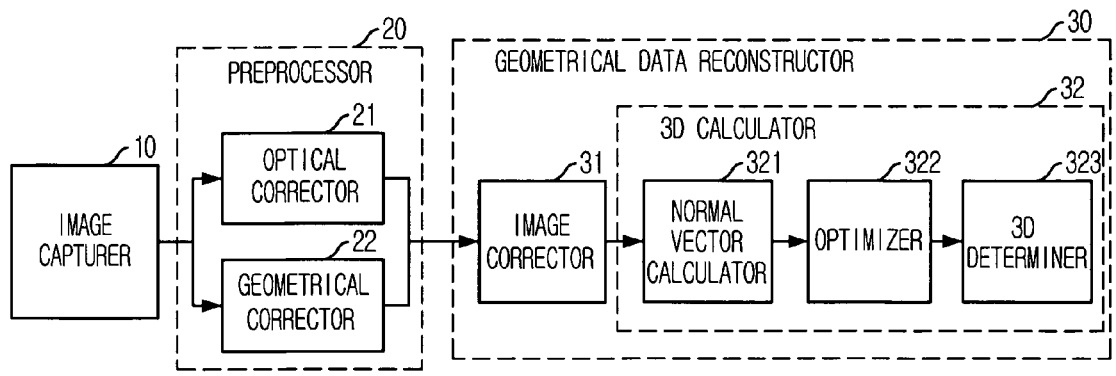
FIG. 1 is a block diagram of an apparatus for reconstructing a 3D shape of an object with depth discontinuity using Helmholtz stereopsis in accordance with an embodiment of the present invention.

FIG. 1 is a block diagram of an apparatus for reconstructing a 3D shape of an object with depth discontinuity using Helmholtz stereopsis in accordance with an embodiment of the present invention.

Referring to FIG. 1, the 3D reconstruction apparatus includes an image capturer 10 for capturing two-pair images (that is, four images) satisfying Helmholtz reciprocity condition, a preprocessor 20 for estimating optical and geometrical characteristics of a camera used for an image capture and applying the estimated characteristics to the subsequent shape reconstruction process, and a geometrical data reconstructor 30 for calculating 3D data of the object from input images.

That is, the geometrical data reconstructor 30 converts Helmholtz restrictions generated from the two-pair images into partial differential equations on the basis of the estimated optical and geometrical characteristics, and then reconstructs 3D surface data of an object with depth discontinuity at a boundary between regions on the basis of the partial differential equations.

Here, in order to satisfy the Helmholtz reciprocity condition, the image capturer 10 captures a pair of images using a camera and an illuminator that are aligned and then captures another pair of images using the camera and the illuminator that are rotated by 180° with respect to each other.

The preprocessor 20 includes an optical corrector 21 and a geometrical corrector 22. The optical corrector 21 extracts the optical characteristic of the camera to determine the actual light radiance corresponding to R/G/B color of the captured image. The geometrical corrector 22 extracts a focal length and a capture position of the camera to calculate internal and external factors of the camera using a 3D grid pattern. Here, the internal factors include a focal length, a principal point, and a CCD aspect ratio, and the external factors include rotation and translation with respect to a 3D reference coordinate system.

The geometrical data reconstructor 30 includes an image corrector 31 and a 3D calculator 32. The image corrector 31 warps images so that one 3D point can projects into the same epipolar line in each pair of images. The 3D calculator calculates a 3D shape of the object on the basis of the warped images received from the image corrector 31.

The 3D calculator 32 includes a normal vector calculator 321, an optimizer 322, and a 3D determiner 323. The normal vector calculator 321 calculates a normalized normal vector of the object on the basis of the warped images received from the image corrector 31. The optimizer 332 assigns error costs to all the 3D points in the viewing volume where the object to be reconstructed is included. Here, the error cost of each 3D point is calculated using normal vector provided by the normal vector calculator 321. The 3D determiner 323 selects a set of 3D points minimizing the total error costs through a dynamic programming, and then reconstructs the 3D surface from the selected 3D points.

Figure 2:
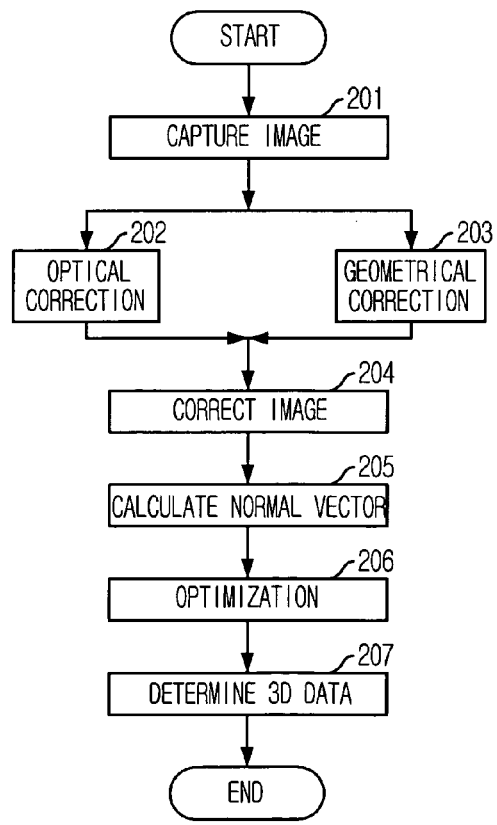
FIG. 2 is a flowchart of a method for reconstructing a 3D shape of an object with depth discontinuity using Helmholtz stereopsis in accordance with an embodiment of the present invention.

FIG. 2 is a flowchart of a method for reconstructing the 3D shape of the object with depth discontinuity using Helmholtz stereopsis in accordance with an embodiment of the present invention.

Referring to FIG. 2, in Step 201, the image capturer 10 captures the two-pair images (that is, four images) satisfying the Helmholtz reciprocity condition.

Figure 3:
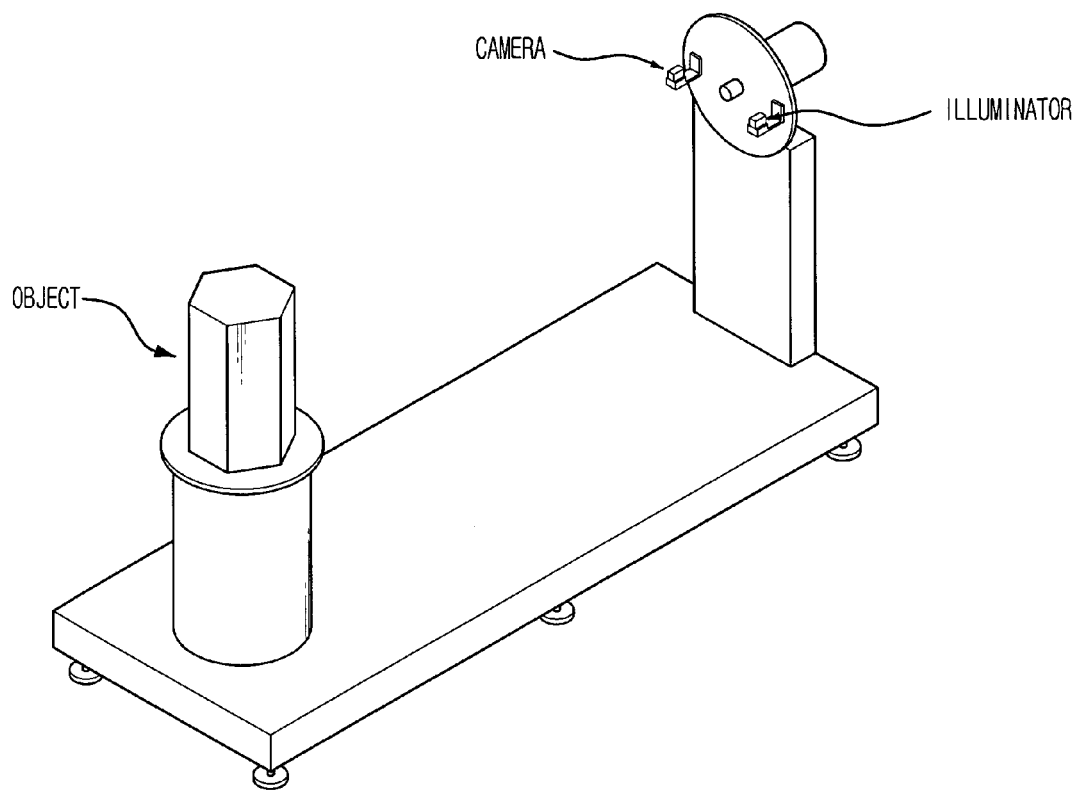
FIG. 3 is a perspective view of a hardware device for capturing an image pair satisfying Helmholtz reciprocity condition in accordance with an embodiment of the present invention.

The image capturer 10 is a hardware device for capturing the two-pair images satisfying the Helmholtz reciprocity condition, an example of which is illustrated in FIG. 3.

In order to satisfy the Helmholtz reciprocity condition, the hardware device in FIG. 3 captures a pair of images using a camera and an illuminator that are aligned and then captures another pair of images using the camera and the illuminator that are rotated by 180°with respect to each other.

In Steps 202 and 203, the preprocessor 20 estimates the optical and geometrical characteristics of the camera used for the image capture. That is, the preprocessor 20 includes the optical corrector 21 and the geometrical corrector 22. The optical corrector 21 extracts the optical characteristic of the camera to determine the actual light radiance corresponding to R/G/B color of the captured image (Step 202). Specifically, the optical corrector 21 receives the R/G/B color value and estimates a function "f" outputting the light radiance corresponding to the received R/G/B color value. This is because the Helmholtz stereopsis uses the actual light radiance applied to the camera, not the R/G/B color value.

This optical correction has been already embodied as open software, and thus their detailed description will be omitted for conciseness.

The geometrical corrector 22 extracts a focal length and a capture position of the camera to calculate internal and external factors of the camera using a 3D grid pattern. Here, the internal factors include a focal length, a principal point, and a CCD aspect ratio, and the external factors include rotation and translation with respect to a 3D reference coordinate system.

Through the geometrical correction, a point (X,Y,Z) on the 3D reference coordinate system is mapped into a point (x,y) of a 2D image. This mapping relationship is expressed as Equation 1 below.

$$s \begin{pmatrix} x \\ y \\ 1 \end{pmatrix} = K [R\ t] \begin{pmatrix} X \\ Y \\ Z \\ 1 \end{pmatrix}, \quad K = \begin{bmatrix} f & 0 & o_x \\ 0 & \alpha f & o_y \\ 0 & 0 & 1 \end{bmatrix} \quad (1)$$

In Equation, "K" is an internal factor matrix for the camera. "f", "α", and "$(o_x, o_y)$" represent a focal length, a CCD aspect ratio, and a principal point of the camera, respectively. "R" is a 3×3 matrix representing the rotation of the camera with respect to the reference coordinate system, and "t" is a 3×1 column vector representing translation of the camera. "s" is a scale constant.

This geometrical correction has been already embodied as open software, and thus their detailed description will be omitted for conciseness.

In Steps 204 to 207, the geometrical data reconstructor 30 reconstructs 3D geometrical data of the object by using the two-pair images (that is, four images) satisfying the Helmholtz reciprocity condition. In this embodiment, the camera is moved so that the four images can be captured at positions perpendicular to one another.

For reduction of calculation, the image corrector 31 warps the images in advance of the main calculation in Step 204.

In the image correction, the images are warped so that $y_1 = y_2$ with respect to first and second 2D image points $(x_1, y_1)$ and $(x_2, y_2)$ corresponding to a 3D image point (X,Y,Z). This correction is performed independently for each pair of captured images. Accordingly, the positions of the two 2D image points corresponding to one 3D image point lies on the same epipolar line and thus the subsequent calculation can be simply performed. The correction of a pair of images is performed as the following processes.

1. The positions $C_1$ and $C_2$ of two cameras are calculated by Equation 2 below.

$$C_1 = -R_1{}^t t_1, \quad C_2 = -R_2{}^t t_2 \quad (2)$$

In Equation 2, "$R_i$" and "$t_i$" (I=1, 2) are respectively a rotation matrix and a translation vector of the camera, which are provided from the geometrical corrector 22.

2. A 3×1 column vector "T" is defined as follows:

$$T = R_1(C_2 - C_1)$$

3. A 3×3 matrix $R_{rec,1}$ is defined as Equation 3 below.

$$R_{rect,1} = \begin{bmatrix} e_1 \\ e_2 \\ e_3 \end{bmatrix}, \quad (3)$$

$$e_1 = \frac{T^t}{\|T^t\|},$$
$$e_2 = [-T(2), T(1), 0],$$
$$e_3 = e_1 \times e_2$$

In equation 3, "$e_1$", "$e_2$" and "$e_3$" are 1×3 row vectors. "$\|T^1\|$" is a norm of a vector and "x" is a vector product.

4. A 3×3 matrix $R_{rec,2}$ is defined as Equation 4 below.

$$R_{rect,2} = R_{rect,1} R_1 R_2{}^t \quad (4)$$

5. A 3×3 matrix K is defined as Equation 5 below.

$$K = \frac{K_1 + K_2}{2} \quad (5)$$

In Equation 5, $K_i$(i=1,2) is an internal factor matrix of each camera, which is provided from the geometrical corrector 6. An image correction matrix $H_i$(i=1,2) is defined as Equation 6 below.

$$H_i = K R_{rect,i} K_i^{-1} \quad (6)$$

The respective image points $(x_i, y_i)$(i=1,2) are respectively corrected into image points $(x_i', y_i')$(i=1,2) by the image correction matrix and Equation 7 below.

$$s \begin{pmatrix} x_i' \\ y_i' \\ 1 \end{pmatrix} = H_i \begin{pmatrix} x_i \\ y_i \\ 1 \end{pmatrix}, \quad (i = 1, 2) \quad (7)$$

In Equation 7, "s" is a scale constant.

In Steps 205 to 207, the 3D calculator 32 receives the corrected image from the image corrector 31 to calculate a 3D shape of the object.

In this embodiment, the 3D data of the object is represented by a function Z(X,Y). That is, the 3D coordinates are expressed as (X,Y,Z(X,Y)). At this time, an X-axis of a 3D space is defined as a line connecting the centers of two cameras for a first pair of images satisfying the Helmholtz reciprocity condition. Likewise, a Y-axis of the 3D space is defined as a line connecting the centers of two cameras for a second pair of images. Since the two cameras are disposed perpendicular to each other between the two-pair images, the two axes are also perpendicular to each other. Also, the Z-axis is defined to be directed from the camera to the object.

Figure 4:
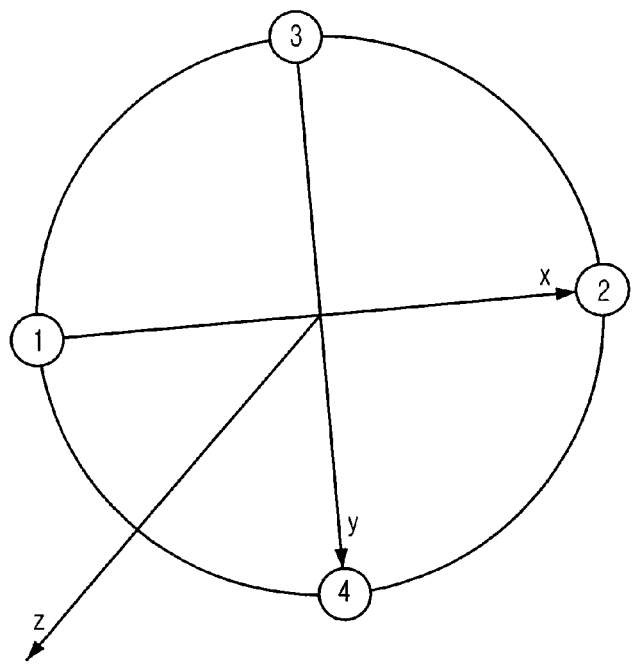
FIG. 4 is a diagram illustrating a process for setting a 3D coordinate system that is applied to a method for reconstructing a 3D shape of an object in accordance with an embodiment of the present invention.

FIG. 4 is a diagram illustrating a process for setting the 3D coordinate system.

Referring to FIG. 4, "1", "2", "3", and "4" represent cameras capturing first, second, third, and fourth images.

In this 3D coordinate system, the normal vector calculator 321 calculates a normalized normal vector $(n_x, n_y, -1)$ in Step 205. The calculation of the normal vector is calculated as the following processes.

1. A 3×1 column vector $v_i$(i=1,2,3,4) is defined as Equation 8 below.

$$v_i = C_i - W \quad (8)$$

In Equation 8, $C_i$ is a 3×1 column vector representing the center position of each camera and is calculated as $C_i = -R_i{}^t t_i$. At this time, $R_i$ and $t_i$ are respectively a rotation vector and a translation vector for the camera, which is provided from the geometrical corrector 22. "W" is a 3×1 column vector representing 3D coordinates of a point on a surface of the object.

2. An X-axis component $n_x$ of a normal vector is calculated as Equation 9 below with respect to a first pair of images.

$$n_x = \frac{e_1(x_1, y)\frac{v_1(3)}{\sqrt{v_1(1)^2 + v_1(3)^2}} - e_2(x_2, y)\frac{v_2(3)}{\sqrt{v_2(1)^2 + v_2(3)^2}}}{e_1(x_1, y)\frac{v_1(1)}{\sqrt{v_1(1)^2 + v_1(3)^2}} - e_2(x_2, y)\frac{v_2(1)}{\sqrt{v_2(1)^2 + v_2(3)^2}}} \quad (9)$$

In Equation 9, $e_i(x_i,y)$ (i=1,2) is a light radiance at an image coordinate where the 3D point W is formed. Since the two images are corrected by the image corrector 31, the y coordinate is the same in the two images. Also, $V_i(m)$ (i=1,2) represents the $m^{th}$ component of the vector $V_i$.

3. An Y-axis component $n_y$ of a normal vector is calculated as Equation 10 below with respect to a second pair of images.

$$n_y = \frac{e_3(x_3, y)\frac{v_3(3)}{\sqrt{v_3(2)^2 + v_3(3)^2}} - e_4(x_4, y)\frac{v_4(3)}{\sqrt{v_4(2)^2 + v_4(3)^2}}}{e_3(x_3, y)\frac{v_3(2)}{\sqrt{v_3(2)^2 + v_3(3)^2}} - e_4(x_4, y)\frac{v_4(2)}{\sqrt{v_4(2)^2 + v_4(3)^2}}} \quad (10)$$

Here, the notation of Equation 10 follows that of Equation 9.

4. When the object has depth discontinuity, Equations 9 and 10 do not act because a shadow occurs.

Figure 5:
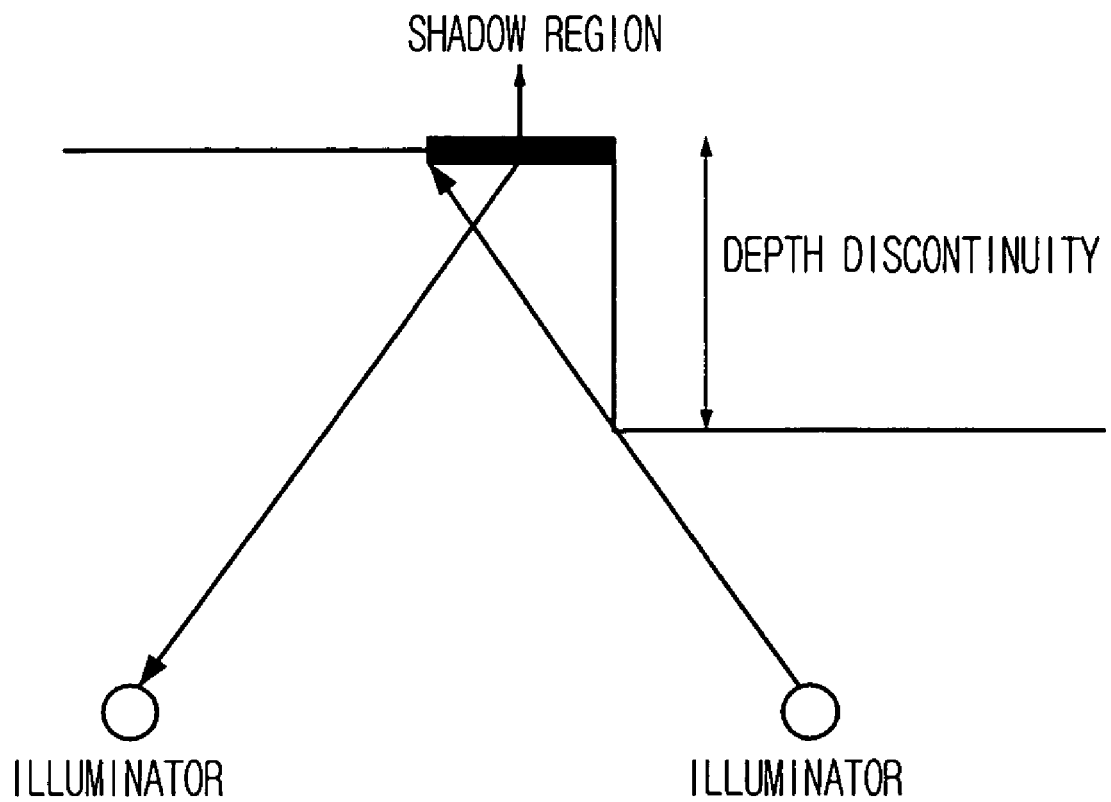
FIG. 5 is a diagram illustrating generation of a shadow due to depth discontinuity in accordance with an embodiment of the present invention.

FIG. 5 is a diagram illustrating generation of a shadow due to depth discontinuity.

Referring to FIG. 5, when a shadow occurs, the radiance of light traveling into the camera facing the shadow is theoretically "0" but is not "0" in reality due to a coherent light. Accordingly, when the light radiance of any one of the cameras is below a certain value in Equation 9 or 10, the corresponding 3D point is considered as a shadow and thus no more calculation is performed. The shadow region is processed by the optimizer 322. Meanwhile, if the light radiances of all of the four cameras are below the certain value in Equations 9 and 10, it means that no object exists at corresponding 3D position. In this case, the corresponding 3D position is considered as an empty space, not the shadow region, and thus is processed differently.

The optimizer 322 calculates 3D object surface data according best with the calculated normal vector received from the normal vector calculator 321.

For each XZ plane, $Y=Y_k$ (K=1, 2, ..., n), in a 3D space with respect to a first pair of images, a function $Z(X,Y_k)$ minimizing the following cost is calculated as Equation 11 below.

$$\int_x \left(\frac{\partial z(x, y_k)}{\partial x} - n_x(x, y_k, z(x, y_k))\right)^2 dx + \int_x occ(x, y_k, z(x, y_k))dx \quad (11)$$

In Equation 11, $n_x$ is an X component of a normal vector at a 3D point $(x,y_k,z(x,y_k))$ calculated by Equation 9. An $occ(x, y_k,z(x,y_k))$ is a function for considering shading by depth discontinuity. Here, $occ(x,y_k,z(x,y_k))$ is defined as Equation 12 below.

$$occ(x, y_k, z(x, y_k)) = \begin{cases} c & \text{if } e(x, y_k, z(x, y_k)) \le t \\ o & \text{otherwise.} \end{cases} \quad (12)$$

In Equation 12, if a point (x,yk,z(x,yk)) belongs to a shadow region, that is, if a light radiance at a corresponding points is below a certain value, occ(x,yk,z(x,yk)) has a constant "c", and otherwise it has "0".

Consequently, minimization of equation 11 considers the discontinuity of the object and simultaneously obtains 3D depth data function $Z(X,Y_k)$ according best with an x component of a normal vector provided from a continuous region.

In actuality, the minimization of Equation 11 is performed in a discrete space. Accordingly, Equation 11 defined in the continuous region is approximately calculated as Equation 13 below in reality.

$$\sum_{i=1}^{n} \left(\frac{z(x_{i+1}, y_k) - z(x_i, y_k)}{x_{i+1} - x_i} - n_x(x_i, y_k, z(x_i, y_k))\right)^2 + \sum_{i=1}^{n} occ(x_i, y_k, z(x_i, y_k)) \quad (13)$$

Equation 13 is minimized using a dynamic programming.

A general dynamic programming is terminated when a function $Z(X,Y_k)$ for minimizing Equation 13 is completely calculated. However, since a second pair of images must also be considered in this embodiment, the function $Z(X,Y_k)$ is not determined directly from the first pair of images. Instead, only the minimum cost $C_1(x_i,y_k,z)$ at each point $(x_i,y_k,z)$(i=2, 3, ..., n) is calculated through the performance of the dynamic programming on Equation 13 and is stored into the memory. This minimum cost is used at the 3D determiner 323.

When the calculation on the first pair of images is completed, 3D data in the direction of an X-axis direction is obtained. Accordingly, 3D data for a Y-axis is obtained through the calculation of the second pair of images. At this time, the second pair of images are optimized as the same manner as the first pair of images with the exception that it has a different optimization energy function from the first pairs of images. That is, when the second pair of images are completely optimized with respect to each YZ plane, an energy function is expressed as Equation 14 below.

$$\sum_{i=1}^{n} \left(\frac{z(x_k, y_{i+1}) - z(x_k, y_{i+1})}{y_{i+1} - y_i} - n_y(x_k, y_i, z(x_k, y_i))\right)^2 + \sum_{i=1}^{n} occ(x_k, y_i, z(x_k, y_i)) \quad (14)$$

In Equation 14, the roles of x and y are interchanged compared to Equation 13. Also, a y component, not an X component, is used for the normal vector.

Minimization of equation 14 for the second pair of images considers the discontinuity of the object and simultaneously obtains 3D depth data function $Z(X_k,Y)$ according best with an y component of a normal vector provided from a continuous region. The function $Z(X_k,Y)$ is not determined directly from the second pair of images. Instead, the minimum cost $C_2(x_i,y_k,z)$ at each point $(x_k,y_i,z)(i=2, 3, \ldots, n)$ is stored into the memory. This minimum cost is used at the 3D determiner 323.

Lastly, the 3D determiner 323 determines a function $z(x,y)$ representing the 3D shape of the object in consideration of the minimum costs $C_1$ and $C_2$ provided from the optimizer 322.

Here, the function $z(x,y)$ is determined by Equation 15 for minimizing the energy function with respect to each XZ plane, $y=y_k$.

$$\sum_{i=1}^{n} \left( \frac{z(x_{i+1}, y_k) - z(x_i, y_k)}{x_{i+1} - x_i} - n_x(x_i, y_k, z(x_i, y_k)) \right)^2 + \quad (15)$$

$$\sum_{i=1}^{n} occ(x_i, y_k, z(x_i, y_k)) +$$

$$\sum_{i=1}^{n} \{C_1(x_i, y_k, z(x_i, y_k)) + C_2(x_i, y_k, z(x_i, y_k))\}$$

The notation of Equation 15 follows that of Equation 13 and its minimization is also performed through the dynamic programming. Accordingly, 3D data according best with x and y normal vectors can be obtained.

The method in accordance with the present invention can be stored in computer-readable recording media (CD-ROM, RAM, ROM, floppy disk, hard disk, magneto-optical disk).

As described above, in accordance with the present invention, the 3D shape of the object with depth discontinuity can be obtained using the Helmholtz stereopsis and the 3D data can be easily obtained four-time image capturing operations at positions perpendicular to one another.

Also, since the 3D shape of the object can be obtained irrespective of the surface characteristics thereof, the shapes of a glittering object and a hair-covered object, which cannot be obtained by the conventional method, can be simply obtained.

The present application contains subject matter related to Korean patent application No. 2004-0104212, filed with the Korean Intellectual Property Office on Dec. 10, 2004, the entire contents of which is incorporated herein by reference.

While the present invention has been described with respect to certain preferred embodiments, it will be apparent to those skilled in the art that various changes and modifications may be made without departing from the scope of the invention as defined in the following claims.

What is claimed is:

1. An apparatus for reconstructing a 3D shape of an object by using Helmholtz stereopsis, the apparatus comprising:
    an image capturer for capturing only two pairs of images satisfying Helmholtz reciprocity condition, the two pairs of images including a first pair of images and a second pair of images;
    a preprocessor for estimating optical and geometrical characteristics of a camera used for the image capturing; and
    a geometrical data reconstructor for converting Helmholtz restrictions generated from the respective pairs of the images into partial differential equations on the basis of the estimated optical and geometrical characteristics, and reconstructing 3D surface data of an object with depth discontinuity at a boundary between regions on the basis of the partial differential equations,
    wherein the first pair of images is used to obtain 3D data of the object in an X-axis direction, the X-axis defined as a line connecting centers of two camera positions for the first pair of images, and the second pair of images is used to obtain 3D data of the object in a Y-axis direction, the Y-axis defined as a line connecting centers of two camera positions for the second pair of images, and
    wherein the X-axis and the Y-axis are perpendicular to each other.

2. The apparatus as recited in claim 1, wherein each pair of images is a Helmholtz image pair obtained at positions perpendicular to one another.

3. The apparatus as recited in claim 1, wherein the image capturer captures the first pair of images using a camera and an illuminator that are aligned and then captures the second pair of images using the camera and the illuminator that are rotated by 180° with respect to each other.

4. The apparatus as recited in claim 1, wherein the preprocessor comprises:
    an optical corrector for extracting the optical characteristic of the camera to determine an actual light radiance corresponding to R/G/B color of the captured image; and
    a geometrical corrector for extracting a focal length and a capture position of the camera to calculate internal and external factors of the camera using a 3D grid pattern, the internal factors including a focal length, a principal point, and a COD aspect ratio, the external factors including rotation and translation for a 3D reference coordinate system.

5. The apparatus as recited in claim 4, wherein the geometrical data reconstructor comprises:
    an image corrector for warping the each pair of images for one 3D point to place on the same epipolar line of each pair;
    a normal vector calculator for calculating a normalized normal vector of the object on the basis of corrected images received from the image corrector;
    an optimizer for assigning error costs to all 3D points in a viewing volume using the calculated normal; and
    a 3D determiner for selecting a set of 3D points minimizing total costs through dynamic programming, and reconstructing the 3D surface from the selected 3D points.

6. A method for reconstructing a 3D shape of an object by using Helmholtz stereopsis, the method comprising steps of:
    capturing, by a camera, only two pairs of images satisfying Helmholtz reciprocity condition, the two pairs of images including a first pair of images and a second pair of images;
    estimating, by a preprocessor, optical and geometrical characteristics of the camera;
    warping, by a geometric data reconstructor, each pair of images for one 3D point to place on the same epipolar line;
    calculating, by a 3D calculator, a normalized normal vector of the object on the basis of the warped images;
    calculating and optimizing, by the 3D calculator, 3D surface data of the object according best with the calculated normal vector; and
    determining, by the 3D calculator, a function representing a 3D shape of the object in consideration of a minimum cost from the optimization step,
    wherein the first pair of images is used to obtain 3D data of the object in an X-axis direction, the X-axis defined as a line connecting centers of two camera positions for the first pair of images, and the second pair of images is used to obtain 3D data of the object in a Y-axis direction, the Y-axis defined as a line connecting centers of two camera positions for the second pair of images, and wherein the X-axis and the Y-axis are perpendicular to each other.

7. The method as recited in claim 6, wherein the optimization step comprises the steps of:

optimizing a first pair of images with respect to each XZ plane $Y=Y_k (k=1, 2, \ldots, n)$ a 3D space on the basis of Equation 1 below, $$\sum_{i=1}^{n} \left( \frac{z(x_k, y_{i+1}) - z(x_k, y_{i+1})}{y_{i+1} - y_i} - n_y(x_k, y_i, z(x_k, y_i)) \right)^2 +$$

$$\sum_{i=1}^{n} occ(x_k, y_i, z(x_k, y_i))$$

where $n_x$ is an x component of a normal vector at a 3D point $(x, y_k, z(x, y_k))$ and an $occ(x, y_k, z(x, y_k))$ is a function for considering shading by depth discontinuity; and optimizing a second pair of images with respect to each YZ plane $x=x_k (k=1, 2, \ldots, n)$ a 3D space on the basis of Equation 2 below, $$\sum_{i=1}^{n} \left( \frac{z(x_k, y_{i+1}) - z(x_k, y_{i+1})}{y_{i+1} - y_i} - n_y(x_k, y_i, z(x_k, y_i)) \right)^2 +$$

$$\sum_{i=1}^{n} occ(x_k, y_i, z(x_k, y_i))$$

where $n_y$ is an y component of a normal vector at a 3D point $(x_k, y, z(x_k, y))$ and an $occ(x_k, y, z(x_k, y))$ is a function for considering shading by depth discontinuity.

8. The method as recited in claim 7, wherein a function $z(x,y)$ representing the 3D data is determined in consideration of the minimum cost $C_1(x_i, y_k, z)$ covering from a start point $x=x_1$ calculated by Equation 1 to each point $(x_i, y_k, z)$ ($k=2, 3, \ldots, n$) and the minimum cost $C_2(x_k, y_i, z)$ covering from a start point $y=y_1$ calculated by Equation 2 to each point $(x_k, y_i, z)$ ($i=2, 3, \ldots, n$), the function $z(x,y)$ being determined by a following Equation for minimizing an energy function with respect to each XZ plane, $y=y_k$ $$\sum_{i=1}^{n} \left( \frac{z(x_{i+1}, y_k) - z(x_i, y_k)}{x_{i+1} - x_i} - n_x(x_i, y_k, z(x_i, y_k)) \right)^2 +$$

$$\sum_{i=1}^{n} occ(x_i, y_k, z(x_i, y_k)) +$$

$$\sum_{i=1}^{n} \{C_1(x_i, y_k, z(x_i, y_k)) + C_2(x_i, y_k, z(x_i, y_k))\}.$$

9. The method as recited in claim 6, wherein each pair of images is a Helmholtz image pair obtained at positions perpendicular to one another, and the Helmholtz reciprocity condition is satisfied by capturing a pair of images using a camera and an illuminator that are aligned and then capturing another pair of images using the camera and the illuminator that are rotated by 180° with respect to each other.

10. The method as recited in claim 9, wherein the preprocessing step comprises the steps of:

extracting the optical characteristic of the camera to determine an actual light radiance corresponding to R/G/B color of the captured image; and extracting a focal length and a capture position of the camera to calculate internal and external factors of the camera using a 3D grid pattern, the internal factors including a focal length, a principal point, and a CCD aspect ratio, the external factors including rotation and translation for a 3D reference coordinate system.

* * * * *